July 7, 1953
M. SADOWSKY
2,644,770
METHOD OF APPLYING FILMS ON CATHODE-RAY SCREENS
Filed March 3, 1948
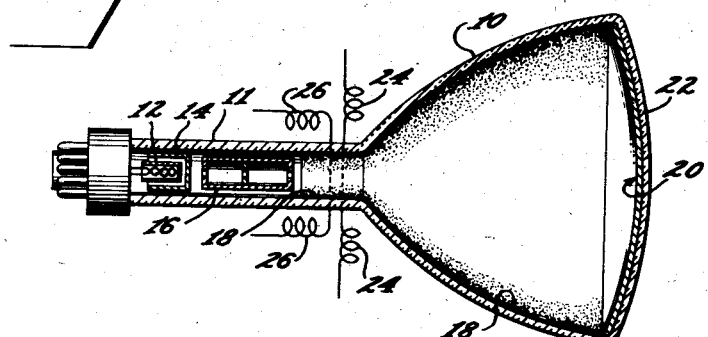
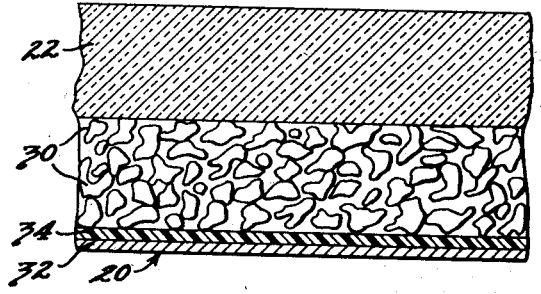
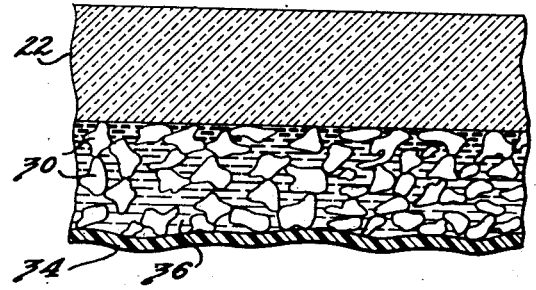
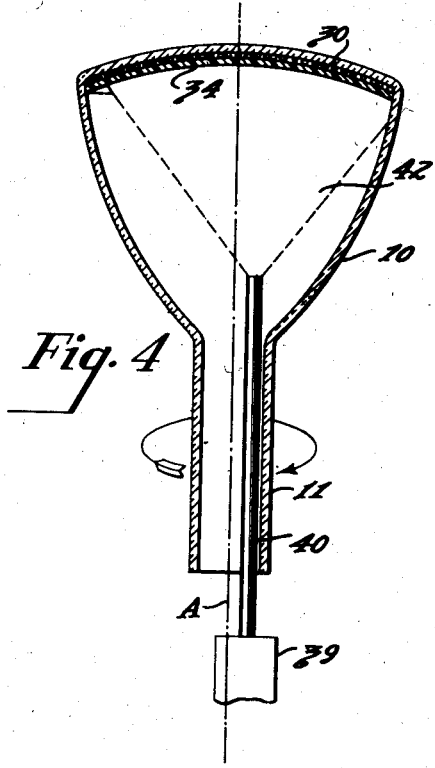
INVENTOR
MEiER SADOWSKY
BY William A. Zelesak
ATTORNEY Patented July 7, 1953

2,644,770

UNITED STATES PATENT OFFICE 2,644,770

METHOD OF APPLYING FILMS ON CATHODE-RAY SCREENS

Meier Sadowsky, Elkins Park, Pa., assignor to Radio Corporation of America, a corporation of Delaware Application March 3, 1948, Serial No. 12,810

10 Claims. (Cl. 117—33.5)

My invention relates to cathode ray tubes of the type having fluorescent target screens and in particular to the method of making such screens.

In certain types of cathode ray projection tubes using an electron beam for producing luminescence in a phosphor screen, it has proved advantageous to cover the phosphor target screen inside the tube with a thin, electron pervious, opaque metal screen. Such a metal screen provides a mirror surface to intensify the luminescent light of the phosphor screen. That is, light from the screen which tends to pass into the tube envelope and be lost to an observer, is reflected by the metallic film to intensify the useful light passing through the tube face. Other advantages are also obtained by the use of a metal backed phosphor screen. Without an opaque screen, light will normally go back into the tube, where it will not be completely absorbed by the conventional black second anode coating, so that, some of the light is scattered back to the phosphor screen to light up dark areas. An opaque metal coating prevents all light from going back into the bulb and results in an improvement in contrast. Furthermore, the metal coating absorbs the negative ion component of the scanning electron beam and prevents its destructive bombardment of the phosphor screen. Also, the function of the metal film as a conductive coating, electrically connected to the second anode of the gun structure, improves resolution, as the target screen will not have to depend on its secondary emission characteristic to maintain potential at the point of focus. Also, phosphors which would not ordinarily be useful due to poor secondary emission properties can be used efficiently with a metal backing.

The metal commonly used is an aluminum coating evaporated on top of the phosphor screen. To produce good reflection, the surface of the aluminum film in contact with the phosphor screen should be of mirror smoothness. Due to the irregular matte surface presented by the phosphor crystals, it is a well known practice to lay down a transparent organic film over the phosphor to provide a smooth foundation layer for the deposition of the aluminum coating. Many difficulties have arisen in successfully laying down the lacquer film and rather complicated procedures are involved.

It is, therefore, an object of my invention to provide an improved method for producing a metal backed phosphor screen.

It is another object of my invention to provide an improved procedure for laying down an organic film on the phosphor layer of a cathode ray tube screen prior to aluminizing of the screen.

It is also an object of my invention to provide a mirror smooth lacquer film covering a phosphor screen for the deposition of a metal coating.

It is a further object of my invention to lay down an organic film on a phosphor surface by a relatively simple and rapid method.

The novel features which I believe to be characteristic of my invention are set forth with particularity in the appended claims, but the invention itself will best be understood by reference to the following descriptions taken in connection with the accompanying drawing, in which:

Figure 1 is a schematic drawing of a cathode ray tube of conventional design;

Figure 2 is a partial sectional view of a fluorescent screen for a cathode ray tube;

Figure 3 is a partial sectional view of a cathode ray screen as viewed during the process of its formation according to my invention; and Figure 4 is a schematic drawing of one step in the method of formation of a fluorescent screen according to my invention.

The tube shown in Figure 1 comprises a highly evacuated glass envelope comprising a tube portion 10 and a neck portion 11. Mounted within the neck portion 11 is a cathode 12 for producing a beam of electrons, a control electrode 14 connected to the usual biasing battery (not shown), and a first anode 16 maintained positive with respect to the cathode 12. A second anode electrode 18 comprises a conductive coating usually of a carbon or graphite film applied to the inner surface of the bulb 10 and a portion of the neck 11 of the envelope, as shown. This, above described, electron gun structure forms, accelerates and focuses a stream of electrons emitted by the cathode 12 into a high velocity electron beam impinging upon a screen 20 applied to a face plate 22 of the envelope. As is well known in the art, the beam of electrons may be scanned across the luminescent screen 20 by either electromagnetic or electrostatic deflecting means. Pairs of deflecting coils for magnetic scanning of screen 20 are shown at 24 and 26. The impinging electron beam excites the phosphor of screen 20 to a luminescence whose light intensity varies according to the energy of the impinging electron beam.

In Figure 2 is shown an enlarged sectional view of the luminescent screen 20 of the cathode ray tube of Figure 1, as seen during the process of its formation. The luminescent screen conventionally comprises a phosphor coating 30 deposited on the inner surface of the cathode ray face plate 22. It has been found advantageous to provide a highly reflective opaque metal coating 32 over the exposed surface of phosphor 30. This metal coating 32 is usually formed by evaporating an aluminum film upon the exposed surface of phosphor 30. One purpose of the aluminum coating 32 is to act as a mirror for the reflection of light tending to enter the bulb 10 from the luminescent phosphor screen 30. Any light from the phosphor entering the bulb can be considered as wasted. Furthermore, without the opaque film 32, light passing into the bulb 10 is not completely absorbed by the black graphite conductive coating 18 and some of it is scattered back to the screen 20 to light up dark areas. In operation then, the metallic coating 32 not only prevents the fluorescent light of phosphor 30 from entering the bulb 10 but also intensifies the useful light passing through the bulb face 22.

To be effective as a good mirror, the reflective surface of the metallic coating 32 should be substantially smooth, so as not to scatter the reflected light to any great degree. Furthermore, the metal coating 32 should not only be sufficiently opaque to prevent transmission of light therethrough but also thin enough to be pervious to the high velocity electron beam impinging upon screen 20.

In the past, it has been a somewhat difficult and involved process to produce a mirror smooth metallic film over the phosphor layer 30. This difficulty has arisen primarily due to the fact that in the application of the phosphor 30 to the face plate 22, the phosphor material consists of irregular odd sized crystals. This results in a phosphor layer 30 having a very irregular and rough matte surface. Applying the metallic coating 32 directly to this roughened, exposed surface of the phosphor layer would cause the reflecting surface of the metal film 24 to conform with the irregularities of the phosphor surface. This would produce a very poor mirror, in that, light reflected from the mirror surface would be scattered in many directions as well as absorbed. It has been common practice to apply, first to the irregular surface of the phosphor screen 20, a thin supporting lacquer film 34. This lacquer film 34 is supported by the irregularities of the exposed phosphor surface and presents a hardened comparatively smooth foundation layer upon which the aluminum coating 32 can be applied.

The lacquer film 34 may be formed of various materials such as appropriate resins or plastics, which can be dissolved in volatile solvents. Such resins or plastics may include cellulose esters such as nitro-cellulose and cellulose acetate; polystyrene; isobutyl methacrylate, etc. The plastic material is dissolved in a volatile solvent or mixture of solvents to make the material free flowing. Plasticizers may also be added to provide the proper elasticity of the lacquer film.

It has been the practice to apply these lacquer films to the phosphor surface by the use of a water pool covering the phosphor surface and onto which the film is deposited and floated into position over the phosphor screen. Afterwards, the water pool is removed to permit the lacquer film on its surface to settle into position and adhere to the rough phosphor. As the lacquer dries and adheres, it tends to contract to form a comparatively smooth film over the roughness of the phosphor and to also conform with any curvature of the screen surface. This process of applying a lacquer film to the screen surface involves not only a complicated procedure, requiring the attention of a skilled operator, but also requires rather critical controls. That is, it is necessary to provide a lacquer, which when applied to the surface of the water pool will not only spread to the desired area but also will remain flexible during the removal of the water pool, so that the film may be stretched down over the roughness of the phosphor as well as over the curvature of the phosphor screen. The film must also remain sufficiently soft during the time of its application so that it will adhere to the screen surface upon coming in contact therewith, yet the resinous film must also be sufficiently dry so as not to penetrate into the phosphor material after the water pool has been removed. Thus, the volatility of the solvents used as well as the conditions of applying the film must be controlled so that these desired results are produced.

My copending application, Serial No. 742,117, filed April 17, 1947, relates to one method of applying an adhering lacquer film to a phosphor screen surface.

My invention, which is the subject of this disclosure, is a method which eliminates many of the objections to the prior practice of laying down a lacquer film. Also my invention provides a simple and rapid way to form an organic resinous film on a phosphor screen surface. First, sufficient water is poured into the bulb 10 to entirely wet the phosphor screen on the face plate 22. The excess water is then poured out of the bulb 10. The water, which remains, is that which adheres to the phosphor screen 20 and fills in the pores or interstices between the phosphor particles 30, as is graphically shown at 36 in Figure 3. The bulb 10 is then placed in a spray chuck (not shown) and a spray gun 39 (Figure 4) is positioned with the end of its nozzle 40 approximately at the point where the neck 11 of the tube begins to flare and form the cone portion 10. The nozzle 40 of the gun 39 is maintained off center with respect to the axis A of the tube neck. The bulb is rotated about the axis A as indicated by the arrow of Figure 4, while at the same time, the lacquer or resinous film material is sprayed onto the screen 30. Afterwards, the bulb is placed in a centrifuge chuck and rapidly rotated about axis A long enough to spread the lacquer material uniformly over the surface of screen 20 and to remove any excess film material which will flow to the edge of the face plate and down the walls of the cone portion 10. The bulb 10 is then removed from the centrifuge chuck and allowed to stand, neck down, for 5 to 25 minutes, the time increasing with the size of the bulb. Excess spray material is removed from the sidewalls of the bulb 10 by swabbing with running water. The 10 is then placed on a drying rack and air dried at room temperature at around 8 lbs. of pressure per square inch, for several minutes. After drying, any remaining lacquer material and water is removed from the neck portion with a clean cloth.

The wetting of the phosphor material 30, before the resinous lacquer is sprayed on, has a very important function. The water fills up the space between the phosphor particles, as is graphically shown at 36 in Fig. 3, and provides a barrier layer to stop the spray material at the point where it is desired to form the lacquer film 34. Also, in a preferred case, a resinous lacquer spray solution is used which will partially mix with the water 36, present in the screen 30, to immediately form a semi-solid precipitate, which in the presence of additional lacquer material sprayed thereon, will fuse to form a continuous resinous film 34 over the phosphor screen. As the film 34 is dried it tends to harden and draw up so that a smoother film 34 is formed adhering to the higher peaks of the rough phosphor surface and stretching across the hollows of the rough surface, as shown in Figure 2.

A preferred spray material used, which forms the lacquer film 34, is a mixture of isobutyl methacrylate dissolved in toluene and acetone. In one form of the material, a stock solution is made by dissolving 60 grams of isobutyl methacrylate in 250 cc. of toluene. The mixture is roll-mixed for approximately three hours or until the isobutyl methacrylate is completely dissolved in the toluene. To prepare the spray solution, 65 cc. of the above described stock solution is mixed with 60 cc. of acetone and 130 cc. of toluene. The spray is applied to the phosphor screen at a pressure of around 3.5 pounds per square inch. For small bulbs it is only necessary to spray the materials on the screen during one revolution of the bulb, while the bulb is being rotated at between 45 and 50 revolutions per minute. For larger bulbs, 10 inches or more, the material is sprayed on for two revolutions.

The presence of the water barrier layer 36 is necessary in carrying out this method successfully. If the phosphor screen 30 were not wetted at all and if the spray material were applied directly to the dry screen, the organic lacquer would penetrate into the screen so that it would be necessary to apply a relatively large amount of film material in order to fill the roughness of the phosphor and form a smooth film surface. This would, however, necessitate the use of so great an amount of lacquer that it would be very difficult if not impossible to remove the plastic lacquer material during the bake-out of the tube. Under such conditions, not only would baking out of excess lacquer material cause blistering of the aluminum layer that is deposited thereon, but, if the lacquer used is a cellulose, there would be a large amount of carbonaceous residue, which would result in a perceptible darkening of the screen due to charring. Such results will also occur with the use of a water barrier layer 36, if too much of the resin were sprayed upon the surface of water 36. In this case, a large amount of lacquer would become sufficiently heavy to push aside the water barrier 36 and would penetrate into the pores of the rough phosphor surface where it would be difficult to remove during "bake out." If there is a penetration of the lacquer material into the phosphor screen, a discontinuous film also will occur resulting in a loss of brightness of the aluminum layer 32 which would be subsequently deposited thereon.

There may be variations in the formula which has been used and which is described above. For example, the amount of the acetone used may be decreased, but this may endanger the uniformness of the film and will require a longer drying time. Also, an increase in the acetone content will give duller films, which in turn will require changes in the schedule of the application. Also, changes in the quantity of the toluene used will provide similar effects and tend to change the time for processing the film. The amount of isobutyl methacrylate may be varied greatly with no change in the film. However, less of the material used will give a thinner film. A thin film will tend to produce breaks and tears during the simultaneous film actions of drying and shrinking. An increase in the amount of isobutyl methacrylate will produce a heavy film which will be hard to bake-out, as indicated above.

The isobutyl methacrylate lacquer material described above is one form of a successful film which has been used in this spray method. A nitrocellulose spray material has also been found to be successful in which the material used is a solution of 20 grams of ½ second nitrocotton in a mixture of 75 cc. of butyl acetate, 25 cc. of butyl alcohol, 20 cc. of ethanol and 80 cc. of xylene. Also another successful spray mixture used is that in which 30 grams of isobutyl methacrylate polymer is dissolved in 70 grams of methyl methacrylate monomer. To this is added 4 grams of benzoyl peroxide to form a sample stock solution. To 25 cc. of this stock solution is added 25 cc. of acetone and 50 cc. of xylene.

Other solutions may be used, but in using a spray method as described above it is essentially necessary to form a barrier layer 36 to stop the spray material at the exposed surface region of the rough phosphor layer 30. The method is more than just that of spraying a lacquer onto a phosphor surface. The novelty of the process is to first provide a barrier material to stop the spray at a point where the lacquer film is to be formed and to prevent the penetration of the spray material into the interstices of the phosphor screen 30. The several spray materials listed above, use a resin or plastic material insoluble in the water barrier layer 36. It is not a definite requirement that water be used for the layer 36. It is conceivable to use any other liquid in which the resin or plastic forming film 34 is insoluble.

The presence of the water barrier 36 also performs a secondary function, when the preferred spray, comprising isobutyl methacrylate dissolved in toluene and acetone, is used. As this spray material hits the water barrier layer 36, the acetone in the spray mixture immediately penetrates the water layer 36 and leaves behind a thickened liquid film of isobutyl methacrylate in toluene, which will "set" more quickly than a spray material in which none of the solvents used are absorbed by the water layer 36. A spray material having a solvent which will mix readily in the water layer 36, does not require as critical a drying schedule, since the film is partially formed immediately upon striking the surface of the water barrier layer 36.

However, it is not necessary to use a spray having a solvent which will mix with the water barrier layer 36. For example, successful films have been produced using a solution of isobutyl methacrylate in an appropriate mixture of toluene and xylene. Neither is it necessary to apply the lacquer material by a spray gun. Successful films have also been made by merely pouring a resinous lacquer material onto a wetted phosphor screen and then removing the excess lacquer.

Also, it is not necessary to confine this method of laying down a lacquer film to a phosphor screen. It is conceivable that such a hard lacquer film might be desired on any rough or matte surface. To practice my invention, it would be necessary first to wet the rough surface material with a liquid having sufficient wetting properties to penetrate into the material and provide a barrier layer or filling between the interstices of the rough surface material.

The advantages of this novel method to prior processes for applying a lacquer film, is that it is, first, a much more rapid way of putting down a resinous film on a phosphor surface. Secondly there is provided a uniformity in the resulting films, which change very little from bulb to bulb. Also this novel method produces a smoother film than is possible by the use of a water pool. The film apparently adheres much better to the phosphor particles which it contacts so that when the film dries it lifts up out of the hollows and is supported mainly between peaks of the phosphor material. A film produced by the spray method has more gloss than that produced by the use of a water pool. This indicates that the points of support of the film are fewer. The film put down by this spray method, also, has much less blistering, or areas where the film pulls loose from the phosphor surface. The lack of blistering, undoubtedly, is due to the fact, that in the spray method the film is already in position as it dries and it does not have to be as extensible and stretch across the phosphor surface as would be the case in the use of a water pool. Also the spray method reduces blistering or a lifting of the lacquer film off of the phosphor surface due to any curvature of the surface. Apparently with this spray method, the lacquer obtains a much better foothold on the phosphor material before it begins to dry and contract. Another advantage of the spray method is that it can be made entirely automatic or may only require the attention of an unskilled operator. After the film 34 has been applied and the screen 20 dried, an aluminum film 32 is applied to the surface of the lacquer film 34. The aluminum layer 32 can be applied by evaporation, in which short lengths of aluminum wire are fixed to a tungsten filament which is heated to a temperature sufficient to melt the aluminum and then to evaporate it completely. The evaporated aluminum is deposited on the inside surface of the bulb 10. The evaporation may be continued for any desired time but it is preferable to continue the evaporation of the aluminum to a point where the aluminum layer 32 becomes opaque. An opaque aluminum layer has the required conductivity for tube operation and also provides the desired metal mirror over the phosphor surface to intensify the useful light of the phosphor screen. Also the aluminum film 32 having this approximate thickness is also sufficiently permeable to the electron beam which scans the phosphor screen 20.

The above described process for aluminizing the phosphor screen 20 is well known in the art and is not considered a part of my invention. The metal film 32 need not be confined to aluminum but may be of any metal such as beryllium or magnesium, which will provide a negligible absorption of the electron beam at the desired operating voltages of the tube. The metal film should be opaque and highly light reflecting for use as a mirror. Also the metal layer 32 should have sufficient conductivity to conduct the full beam current of the tube. It should also be strong enough to withstand the stresses due to effect of the focused beam. The metal layer 32 should also be durable enough to withstand the necessary subsequent processing of the tube and should be of a metal that will not chemically react with the luminescent screen material. Aluminum is chosen because it combines properties which provide the best combinations in meeting the above conditions and also due to the fact that it is easily applied by evaporation.

While certain specific embodiments have been illustrated and described, it will be understood that various changes and modifications may be made therein without departing from the spirit and scope of the invention.

What I claim as new is:

1. The method of applying to a rough mat surface of a fluorescent screen a metallic reflecting film, the method comprising the steps of, wetting the mat screen surface with sufficient liquid to fill the interstices of the fluorescent screen, removing any excess of the liquid not adhering to the mat screen surface, applying by a spray to the wet screen surface a sufficient amount of a solution formed from an organic solute insoluble in said liquid and a solvent soluble in said liquid to form a continuous film of the organic solute, rapidly rotating the fluorescent screen about an axis through the screen surface to remove excess organic material to the edge of the screen, drying the mat screen surface and film to form a hard smooth film over the mat screen surface, and applying a reflecting metal coating onto said organic film.

2. The method of applying to a mat surface of a phosphor screen a reflecting metallic coating, the method comprising the steps of, wetting the screen with sufficient water to fill the interstices of the phosphor screen to provide a substantially smooth surface, removing any excess water not adhering to the mat surface of the screen, applying by spraying onto the wet mat surface of the screen a sufficient amount of a solution formed of a solvent soluble in water and an organic solute insoluble in water to form a continuous film of the organic solute, rapidly rotating the phosphor screen about an axis through the screen surface to remove any excess organic solution material to the edge of the screen, removing from the screen the water and solvent by drying to leave a hard smooth organic film over the mat surface, and applying a reflecting metallic coating on said hard organic film.

3. The method of applying to a rough surface of a phosphor screen a reflecting aluminum coating, the method comprising the steps of, wetting the screen with sufficient water to fill the interstices of the phosphor screen to provide a smooth surface, removing any excess of the water not adhering to the mat surface of the screen, spraying onto the wet screen surface a sufficient amount of a solution formed of isobutyl methacrylate dissolved in acetone to form a continuous film of precipitated isobutyl methacrylate, rapidly rotating the screen about an axis through the screen surface to remove any excess isobutyl methacrylate, removing the water and acetone by drying to form a hard organic film over the rough surface of the screen, and evaporating a reflecting aluminum coating onto said hard organic film.

4. The method of applying a metal film to a rough surface of a luminescent screen adhering to a portion of the inner surface of a discharge tube, the method comprising the steps of, wetting the screen with sufficient liquid to fill the interstices of the luminescent screen to provide a smooth surface, pouring out of the tube any excess liquid not adhering to the rough screen surface, spraying onto the wet screen surface sufficient solution of polystyrene while rotating the luminescent screen about an axis normal thereto to form a continuous film over the screen surface, drying the screen to form a hard smooth film of polystyrene over the rough surface and applying to a reflecting metal coating onto said hard smooth film.

5. The method of applying a metal film to a phosphor screen adhering to the inner surface of a discharge tube, the method comprising the steps of, wetting the screen with sufficient water to fill the interstices of the phosphor screen to provide a smooth surface, pouring out of the tube any excess of the water not adhering to the screen surface, spraying onto the wet screen surface sufficient solution of nitrocellulose and acetone to form a continuous film over the screen surface, rapidly rotating the tube about an axis through the phosphor screen to remove any excess nitrocellulose solution to the edge of the screen, drying the nitrocellulose film to form a hard smooth film over the phosphor surface, and applying a reflecting metal coating onto said nitrocellulose film.

6. The method of applying a reflecting metal film to a phosphor screen adhering to the inner surface of the face plate of a cathode ray tube, the method comprising the steps of, wetting the screen with sufficient water to fill the interstices of the phosphor screen, pouring out of the tube the excess water not adhering to the phosphor screen, spraying onto the wet screen surface sufficient organic solution of nitrocellulose dissolved in a mixture of ethanol and xylene to form a continuous film over the screen surface, rapidly rotating the bulb to remove any excess organic material to the edge of the screen, drying the screen to form a hard smooth film over the phosphor surface and applying a reflecting metal film to the exposed surface of the hard organic film.

7. The method of applying a reflecting metal coating to a phosphor screen adhering to an inner concave surface of a cathode ray bulb, the method comprising the steps of, wetting the screen with sufficient water to fill the interstices of the phosphor screen, pouring out of the bulb any excess water not adhering to the surface of the screen, spraying onto the wet screen surface sufficient organic solution of isobutyl methacrylate dissolved in toluene and xylene while rotating said cathode ray bulb about an axis through the screen to form a continuous film over the screen surface, rapidly rotating the bulb about an axis through the screen surface to remove any excess organic material to the edge of the screen, drying the screen to form a hard smooth film over the phosphor surface, and applying a reflecting metal coating to the exposed surface of the film.

8. The method of producing a reflective luminescent screen in a cathode ray tube bulb, the method comprising the steps of, applying a phosphor coating to the inner surface of the face plate of the bulb, wetting the phosphor coating with sufficient water to fill the interstices of the phosphor coating, removing from the bulb any excess water, not adhering to the surface of the screen, spraying onto the exposed surface of the wet phosphor coating a solution of isobutyl methacrylate in acetone to form a continuous film over the screen surface, rapidly rotating the bulb about an axis through the face plate to remove any excess of said solution to the edge of the screen, drying the screen to form a hard smooth organic film over the phosphor surface, applying a reflective metal coating to the exposed surface of the film.

9. The method of applying a reflecting metal coating to a phosphor screen enclosed within the bulb of a cathode ray tube, the method comprising the steps of, wetting the screen with sufficient water to fill the interstices of the phosphor coating to provide a smooth surface, removing any excess water from the screen not adhering to the surface of the screen, spraying onto the wet screen surface a sufficient amount of a solution of isobutyl methacrylate in acetone while rotating said bulb about an axis through the phosphor screen to form a continuous film of the organic solute, removing from the screen the water and solute by drying to leave a hard smooth organic film over the phosphor surface, and applying a reflecting metal coating to the exposed surface of the organic film.

10. The method of applying a reflecting metal coating to a phosphor screen adhering to the inner surface of the fact plate of a cathode ray tube, the method comprising the steps of, wetting the screen with sufficient water to fill the interstices of the phosphor screen, removing any excess water from the bulb not adhering to the surface of the screen, spraying onto the wet screen surface a sufficient amount of a solution of cellulose acetate dissolved in acetone to form a continuous film of precipitated cellulose acetate, rotating the bulb about an axis through the screen surface to remove excess solution to the edge of the screen, and removing the water and acetone from the bulb by drying to form a hard organic film over the phosphor screen surface, evaporating a coating of aluminum over the hard organic film.

MEIER SADOWSKY.

References Cited in the file of this patent
UNITED STATES PATENTS

| Number | Name | Date |
|--------|------|------|
| 618,672 | Henry | Jan. 31, 1899 |
| 2,130,530 | Fletcher | Sept. 20, 1938 |
| 2,233,786 | Law | Mar. 4, 1941 |
| 2,374,310 | Schaefer | Apr. 24, 1945 |